W. THREADGILL.
MACHINE FOR PICKING COTTON.
APPLICATION FILED MAR. 6, 1919.

1,340,577.

Patented May 18, 1920.
6 SHEETS—SHEET 1.

INVENTOR.
Wilmer Threadgill
BY Percy H. Moore
ATTORNEY.

W. THREADGILL.
MACHINE FOR PICKING COTTON.
APPLICATION FILED MAR. 6, 1919.

1,340,577.

Patented May 18, 1920.
6 SHEETS—SHEET 3.

INVENTOR.
Wilmer Threadgill
BY
Percy H. Moore
ATTORNEY.

W. THREADGILL.
MACHINE FOR PICKING COTTON.
APPLICATION FILED MAR. 6, 1919.

1,340,577.

Patented May 18, 1920.
6 SHEETS—SHEET 6.

INVENTOR.
Wilmer Threadgill
BY Percy H. Moore
ATTORNEY.

UNITED STATES PATENT OFFICE.

WILMER THREADGILL, OF LAREDO, TEXAS.

MACHINE FOR PICKING COTTON.

1,340,577.     Specification of Letters Patent.     Patented May 18, 1920.

Application filed March 6, 1919. Serial No. 281,012.

*To all whom it may concern:*

Be it known that I, WILMER THREADGILL, citizen of the United States of America, residing at Laredo, in the county of Webb and State of Texas, have invented certain new and useful Improvements in Machines for Picking Cotton, of which the following is a specification.

This invention relates to new and useful improvements in cotton picking.

The object of the invention is to provide a machine of the character described which has been specially designed for the purpose of picking cotton fiber from the plants of the row, said machine being adapted to pass along over the row and to extract the fiber from the bolls of the plants.

Another object of the invention resides in the provision of means for discharging the hairy tuft of the cotton seeds and the cotton seeds into elevating chutes whereby it is elevated and discharged into a suitable receptacle mounted upon the framework of the machine.

A further feature of the invention resides in the provision of a machine of the character described which operates automatically and which will pass along over the row of plants and extract the cotton therefrom without injury to the plants and without collecting the leaves or stems or mingle the same with the cotton picked.

Figure 1:
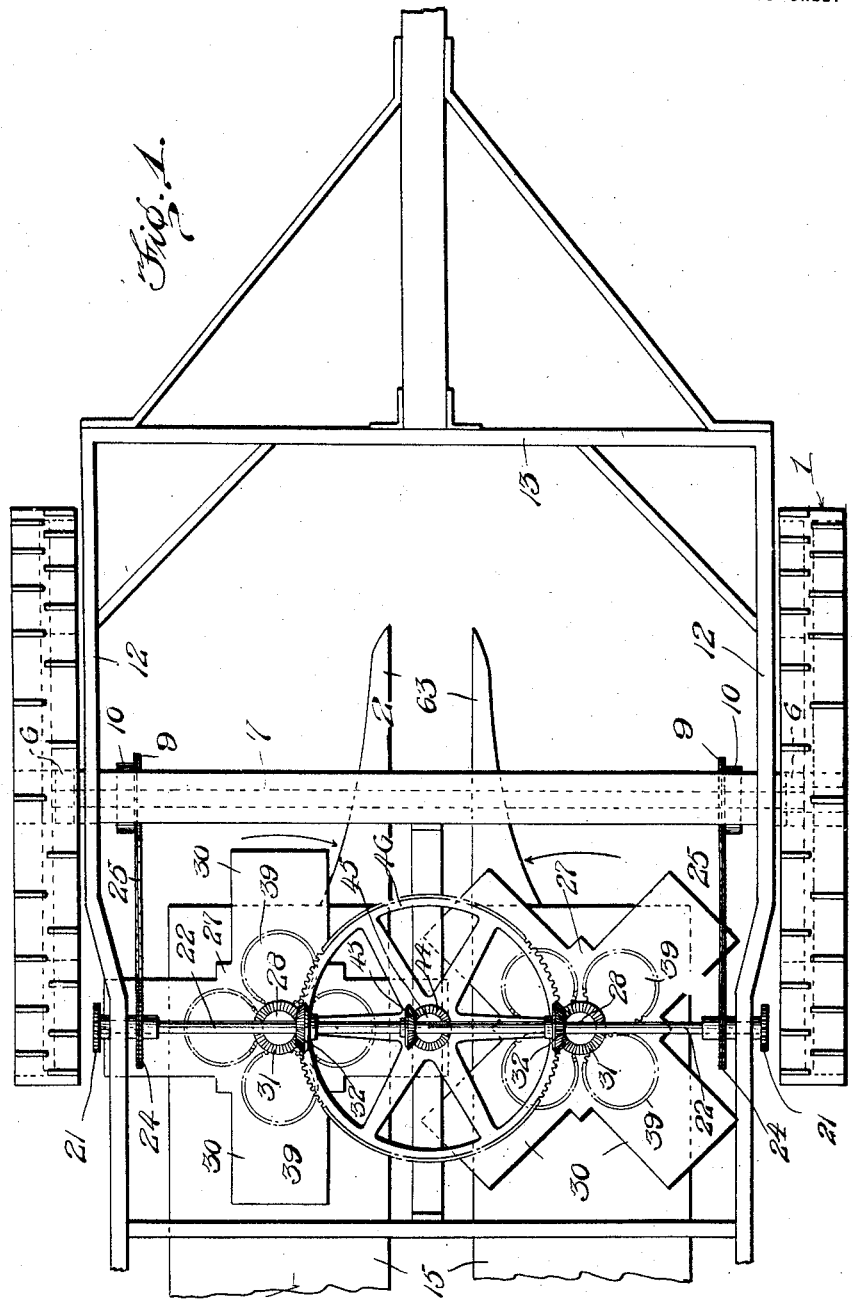
Figure 2:
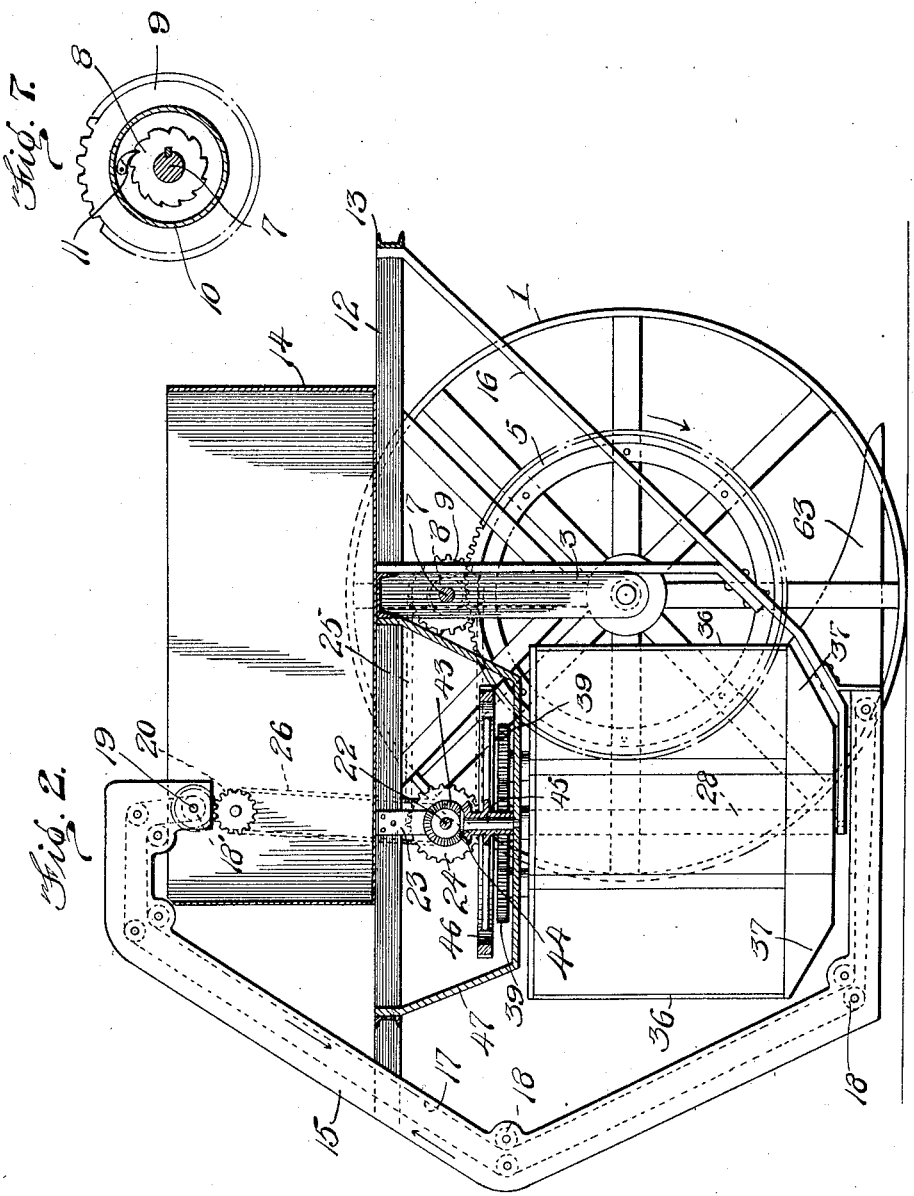
Figure 3:
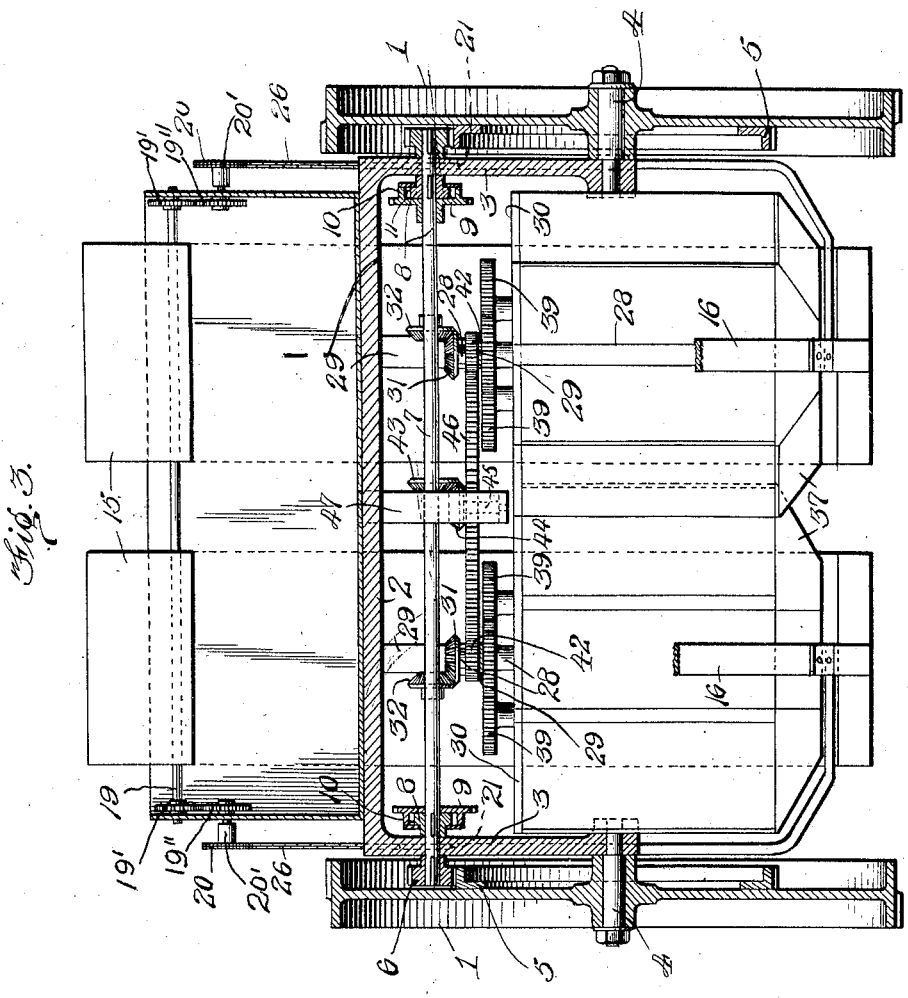
Figure 4:
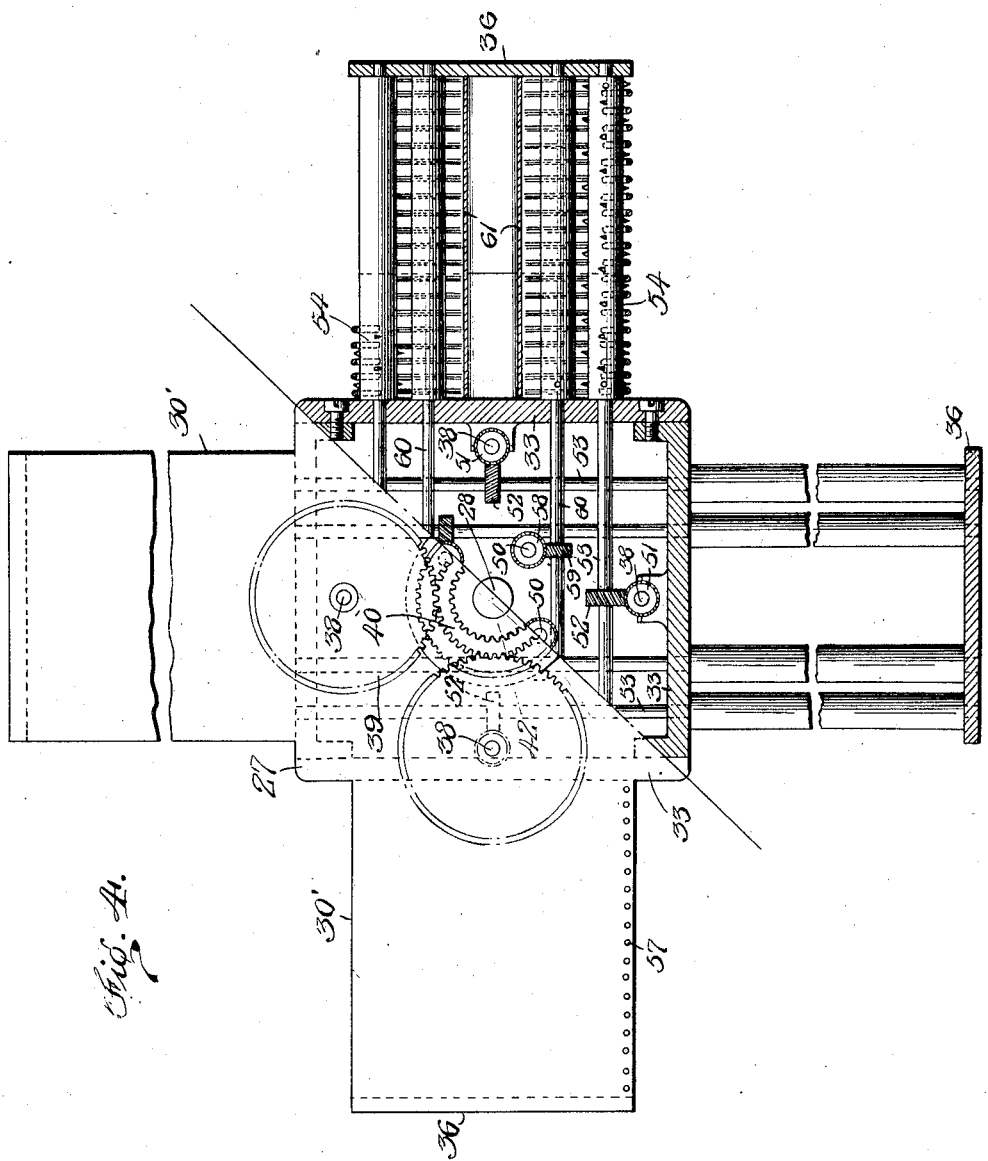
Figure 5:
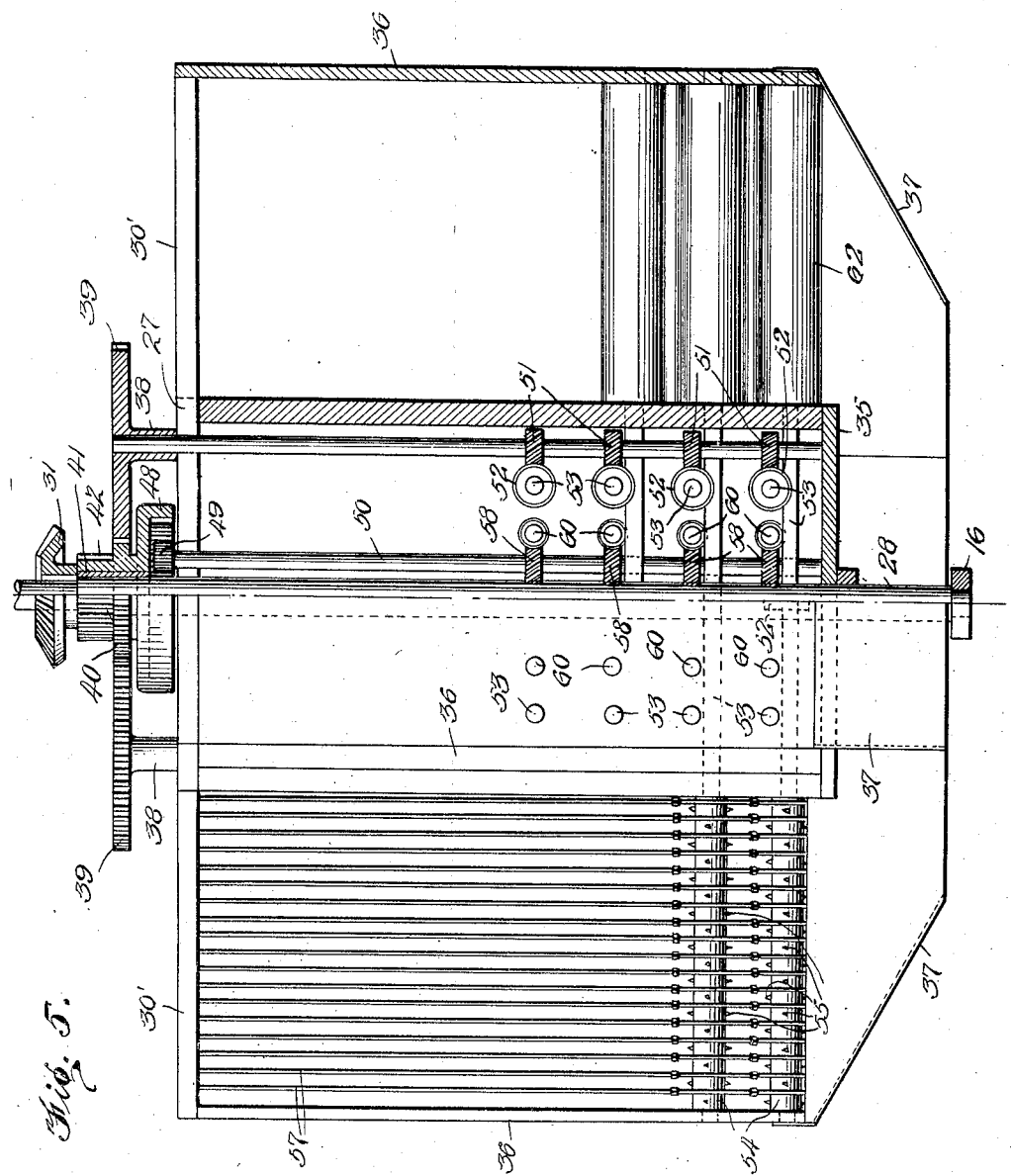
Figure 6:
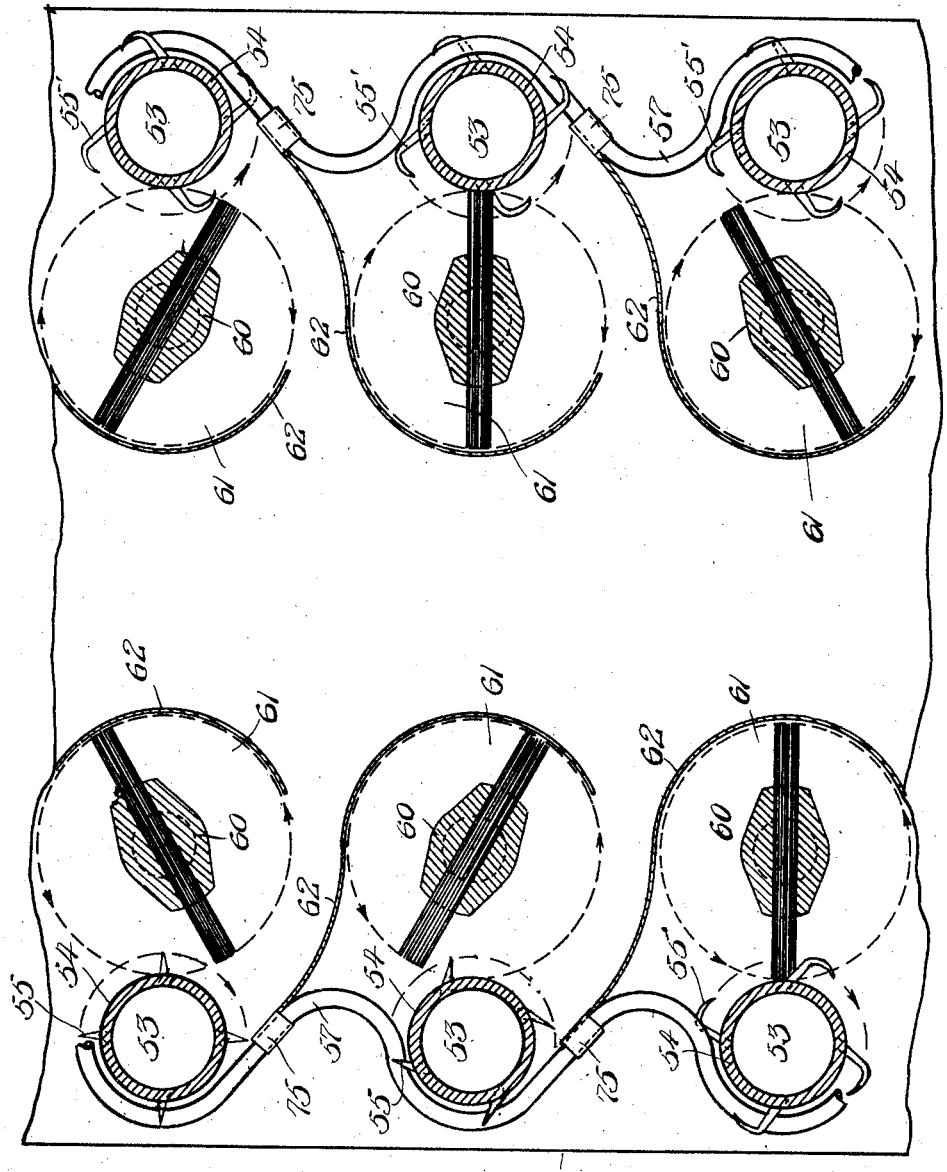

With the above and other objects in view, the invention has particular relation to certain novel features of construction, operation and arrangement of parts; an example of which is given in this specification and illustrated in the accompanying drawings, wherein:

Figure 1 is a plan view of the device; Fig. 2 is a vertical, sectional view thereof; Fig. 3 is a transverse sectional view; Fig. 4 is a plan view of one of the picker frames shown partially in section; Fig. 5 is a side elevation thereof shown partially in section; Fig. 6 is an enlarged fragmentary, vertical, sectional view thereof; and Fig. 7 is a detail view of the pawl 11 and the ratchet 8.

Referring now more particularly to the drawings, wherein like numerals of reference designate similar parts in each of the figures, the numerals 1, 1 refer to the supporting wheels and the numeral 2 refers to the axle. This axle is of an inverted U-shape form, having its ends turned downwardly, forming the arms 3, 3 whose ends carry the outwardly extending spindles 4, 4 whereon the wheels 1, 1 are mounted. The traction wheels 1, 1 have the respective annular spur gears 5, 5 fixed to the spokes thereof on the inside, said spur gears being in mesh with corresponding spur gears 6, 6 which are fixed upon the respective ends of the transverse shaft 7, said shaft being rotatable in suitably alined bearings in the arms, 3, 3 of the axle 2. Splined upon the shaft 7 are the ratchet wheels 8, 8 and loosely mounted upon said shaft are the respective sprocket wheels 9, 9, said sprocket wheels having the annular turned down flanges 10, 10 formed integrally therewith and fitting over said ratchet wheels to confine them in fixed relation to the sprocket wheels; and said sprocket wheels have the dogs 11, 11 pivoted thereto and arranged to be engaged with the ratchet wheels when the machine is moving forwardly so as to cause the said sprocket wheels to rotate with the shaft 7 but to disengage when the machine is moved backwardly to permit the shaft 7 to run idly with respect to the sprocket wheels 9. A framework is provided including suitable side members 12, 12 connected at their forward ends by the bar 13, said framework being fixed to the axle 2 and being provided to support the operating mechanism of the machine; and mounted on this framework is a suitable receptacle 14 which receives the picked cotton, said cotton being delivered to said receptacle through the elevator chutes 15, 15. The lower ends of these chutes are arranged horizonally underneath the machine and are fastened to and suspended from the respective brackets 16, 16, which are secured to and depend from the framework; the chutes extend upwardly around the rear end of the machine and their upper discharge ends are turned downwardly into the receptacle 14. Within the respective chutes are the endless traveling aprons 17, 17 which move upon transverse anti-friction rollers, as 18, rotatably mounted in the chutes at all points needed, and fixed upon the shaft 19 are the rollers 18′, 18′ through which power and motion is given to the aprons 17, 17. Fixed upon the ends of the shaft 19 are the spur gears 19′, 19′ and in mesh with these are the spun gears 19″, 19″ which are set loose on short arms or shafts 20′, 20′ riveted to the receptacle 14; and also running loose on said shafts 20', 20' are sprocket wheels 20, 20, which are in alinement with corresponding sprocket wheels 21, 21 which are fixed upon the respective ends of the countershaft 22. This countershaft is rotatable in suitable bearings 23, 23 which depend from the framework, and there is also fixed thereon the sprocket wheels 24, 24 which are in alinement with the respective sprocket wheels 9, 9; and the former are driven from the latter through the sprocket chains 25, 25 which operate thereover and rotation is thereby imparted to the shaft 22 and transmitted by it through the sprocket chain 26, 26 which operate over the respective sprocket wheels 20 and 21 and transmit rotation from the latter to the former and through the spur gears 19'', 19'' and then through the spur gears 19', 19' to the shaft 19 and then to the rollers 18', 18' which are fixed upon the shaft 19. The traveling aprons are thereby caused to revolve in the direction indicated by the arrows in Fig. 2. The horizontal portions of the chutes 15, 15 are open above to expose said aprons to the cotton fiber; and the cotton gathered from the stalks, in the manner hereinafter described, falls down upon said aprons and is by them conducted up through said chutes and delivered into the receptacle 14.

Two rotatable picker frames 27, 27 are provided which are fixed to the central vertical shafts 28, 28 whose lower ends have bearings in the rear ends of the respective brackets 16, 16 and whose upper ends have bearings in the corresponding brackets 29, 29 which are fixed to and depend from the frame work. These picker frames are shown in detail in Figs. 4 and 5 and as shown have the oppositely disposed radial wings 30. The picker frames are spaced apart and are arranged on opposite sides of the central line of the machine and are geared to rotate in the direction indicated by the arrows on Fig. 1. The upper ends of the shafts 28, 28 have the respective beveled gears 31, 31 fixed thereon, which are in mesh with the corresponding bevel gears 32, 32 which are fixed on the shaft 22. The gearing is such that the picker frames rotate at about the same rate of speed as the traction wheels 1, 1 travel forward; so that as the machine moves along the row, the extremities of the wings will have little or no rearward nor forward movement relative to the plants passing between the frames and thus the plants will be only slightly agitated in passing through between the frames and will be comparatively uninjured, thus preventing leaves and broken limbs from being gathered therefrom during the picking operation. The frames are so arranged relative to each other that, as they rotate, the wings of the one frame will fall between the wings of the other frame, thus permitting the frames to rotate freely without coming into contact with each other and with comparatively little injury to the plants in the row.

The picker frames are detailed in Figs. 4 and 5; and their bodies are substantially rectangular in horizontal cross sectional view and include the side walls 33 suitably secured together, and the top 34 and the bottom 35 which are suitably anchored to said side walls having the radial extensions 30', forming the top portions of the wings 30; and these wings are formed with vertical end plates 36. The lower ends of these wings are formed into hoppers 37 which converge downwardly and conduct the picked cotton into the elevating chutes 15, 15 as shown in Fig. 5. Each picker frame has four vertical shafts 38, suitably disposed around the central shaft 28, and having bearings in the top and bottom walls 34 and 35 respectively of the picker frames; and fixed to the upper ends of these shafts are the spur gears 39 which are in mesh with a spur gear 40, carried by the sleeve 41. This sleeve is rotatable on the shaft 28 and also carries a spur gear 42 above the gear 40. The shaft 22 has a centrally located bevel gear 43 fixed thereon which is in mesh with a corresponding bevel gear 44 fixed on the upper end of the short vertical shaft 45. This shaft is rotatable in a suitable bearing carried by the bracket 47 and has the large spur gear wheel 46 fixed thereon, which is in mesh with the respective spur gears 42, 42 and rotates the same. Rotation is thereby imparted to the 8 spur gears 39 and transmitted by them to the 8 shafts 38. The lower ends of the sleeves 41, 41 upon which the spur gears 40, 40 and 42, 42 are mounted are formed into internal annular spur gears 48, 48 which are in mesh with the 8 spur gears 49 fixed upon the ends of the 8 respective shafts 50.

In each of the two picker frames, there are four of these shafts 38 and 50 and they are suitably disposed around the central shaft 28 and have bearings in the top and bottom plates 34 and 35 of the picker frames. Each shaft 38 has a plurality of worm gears 51 fixed thereon, each of which gears 51 is in mesh with corresponding worm gears 52, said worm gears 52 being fixed upon their respective transverse shafts 53. These shafts 53 are arranged in vertical alinement and extend transversely entirely across the picker frames and have bearings in the walls 33 and also in the end plates 36 thereof and carry on each end the picker rollers 54, which are fixed thereto and located between the walls 33 and the corresponding end plates 36 on each side; and these picker rollers have peripheral teeth 55 or 55', projecting out therefrom and provided to engage with the fiber of the plants, extracting the same from the bolls. These teeth may be of any desired form, such as shown at 55 and 55' in Fig. 6. The wings 30 are provided on each side with a cage work, formed of vertically extending rods 57, which are fastened at their upper and lower ends to the wings of the picker frame. As shown in Figs. 5 and 6, these rods are spaced apart and are formed into successive arcuate sections so as to conform to the contour of and fit closely around the outer sides of the rollers 54 but may be of any suitable shape; and the picker teeth are arranged to pass through the slits between these rods as the picker rollers turn; and the teeth carry the fiber and seed through said slits, but the cage work stops the leaves and stems and prevents them from being mingled with the cotton fiber or tuft. Rotation is imparted to the picker rollers from the shaft 38 through the gearing heretofore described.

The shafts 50 have the worm gears 58 fixed thereon and spaced apart, which are in mesh with corresponding worm gears 59. These last mentioned worm gears are fixed, one upon each of the shafts 60; and these last mentioned shafts are in vertical alinement and extend transversely through the picker frame and have bearings in the side walls 33 thereof and in the end plates 36. Fixed upon the outer ends of these shafts between the respective side walls 33 and the corresponding end plates 36 are the rotatable brushes 61, which are rotatable from the shafts 50; and these brushes are located on the inside of the hoods 62 adjacent to the respective picker rollers 54 and are arranged to engage with the fiber and remove the same from the teeth of said rollers as the brushes rotate. Oblong hoods 62 are provided, which are formed of any suitable material preferably sheet metal. These hoods are anchored to the cage rods 57 by a clip 75 or the like and are provided to inclose the respective brushes, as shown in Fig. 6, so as to prevent the fiber brushed from any particular roller from falling upon the brush beneath. The fiber brushed from any particular roller will fall upon the hood beneath and thence through the hopper 37 to the corresponding apron 17 traveling in the corresponding chute 15.

In operation the machine is drawn along the row of cotton, the picker frames revolving at approximately the same rate of speed the machine travels so that the wings of the picker frames will come in contact with the bolls of the stalk, the teeth 55 or 55' or the like engaging the fiber and carrying it through the cage work of said wings. The fiber is cleaned from the teeth by means of the brushes 61 and falls upon the hood 62 therebeneath and passes over said hoods and falls through the hoppers 37 into the discharged into the receptacle 14. In case the plants or the limbs thereof have fallen too low to be engaged by the hoods, they are raised by the forwardly extending lifting guides 63, 63, which are secured to and project forwardly from the inner sides of the respective hoppers 37, 37 and are formed to engage under and lift said plants or limbs into vertical positions so that they will be engaged by and pass between the picker frames as the same rotate.

What I claim is:

1. In a cotton picker and the like, rotatable means provided with rotary picking means and guarding means for said picking means, said picking means moving in a path or plane intermediate of and outwardly and inwardly of the position of said guarding means, said guarding means including a plurality of undulatory septum forming members secured to upper and lower members and arranged to conform to a segment of each picker with the teeth of the pickers projecting between said guarding members, alternating undulations partitioning off said pickers from each other, and coöperating means for imparting the aforesaid movements to said elements.

2. In a cotton-harvester and the like, rotatable means provided with rotary picking means, guarding means for said picking means, and rotary fiber deleting means, said picking means moving in a path intermediate of, and outwardly and inwardly of the position of said guarding means and said fiber-deleting means moving in a plane causing the same to engage any fiber or foreign substance which may adhere to the picked cotton carried by said picking means, said guarding means including a plurality of undulatory septum forming members secured to upper and lower members and adapted to conform to a segment of each picker, alternating undulations partitioning off said pickers from each other, and means coöperating with the aforesaid elements for actuating the same.

3. In a cotton-harvester and the like, rotatable means provided with rotary picking means, the latter means comprising slender teeth, and guarding means for said teeth, said teeth having movement intermediate of, and outwardly and inwardly of the position of said guarding means, said guarding means including undulatory septum-forming members secured to upper and lower members and adapted to conform to a segment of each picker, alternating undulations partitioning off said pickers from each other, and means coöperating with the aforesaid elements for actuating the same.

4. In a cotton-harvester and the like, a rotatable cage-like member including spaced rods, picking means formed of teeth or neesaid rods, in a circular path, hoods applied to said cage-like member with respect to said rods, in successive arcuate outline, and means for rotating said cage-member and means for actuating said picking means.

5. In a cotton-harvester and the like, a rotatable cage-like member including spaced rods, picking means comprising teeth having a movement intermediate of said rod-members, in a circular path, rotary brushes carried by said cage-member, hoods applied to said cage members, with respect to said rods, and conforming circumferentially to said brushes, and extending in successive arcuate outline, means for rotating said cage-like members and means for actuating said picking means.

6. In a cotton-harvester and the like, rotatable picking means comprising a radially armed tubular member equipped with spaced rods, rotary picking teeth having movement, intermediate of said rods, in a circular path, means for rotating said radially armed contrivance and means for actuating said teeth.

7. In a cotton-harvester and the like, rotatable picking means comprising a plurality of radially armed members equipped with rotary teeth, guarding means for said teeth including spaced rods, said teeth having movement, intermediate of said rods, in a circular path, means for rotating said plurality of radially armed members and means for similarly operating said teeth.

8. In a cotton-harvester and the like, rotatable picking means comprising a plurality of radially armed members equipped with rotary teeth, guarding means for said teeth including spaced rods, said teeth having movement intermediate of said rods, in a circular path, rotary brushes positioned adjacent said rotary teeth, hoods applied to said radially armed members, with respect to said rods, and adapted to conform to said brushes circumferentially, means for rotating said radially armed members and means for actuating said teeth.

9. In a cotton harvester and the like, rotatable means provided with rotary rollers equipped with picking teeth, guarding means for said teeth, rotary brushes positioned adjacent to said tooth-equipped rollers, hoods applied to said rotatable means and secured to said tooth-guarding means, and adapted to protect or guard said brushes, said hoods being adapted to conform to said brushes circumferentially, said picking teeth having movement, intermediate of said tooth-guarding means, in a circular path, means for actuating said rotatable means, and means for rotating said tooth-equipped rollers.

10. In a cotton-harvester and the like, rotatable picking means comprising a plurality or series of radially armed tubular members, each series of tubular members having separate and coöperative movement with respect to the other series or plurality of tubular members with their arms adapted to interfit one within the other and interact upon the cotton plants, said tubular members being equipped with rotary tooth-equipped rollers, guarding spaced means for the roller-teeth, rotary brushes positioned adjacent said tooth equipped rollers, hoods applied to said tubular members and adapted to guard said brushes, said hoods being adapted to conform to said brushes circumferentially, means for actuating said tubular members, means for rotating said tooth-equipped rollers and means for operating said brushes.

11. In a cotton gathering machine and the like, including a framework and carrier wheels, including a series of door-like members made and arranged so as to revolve upon vertical axes and pass between the limbs of the plants, picker means in said door-like members for gathering the fiber from the plants, means for brushing the fiber from said picker means, means for elevating said fiber from said members into a receptacle upon the framework, and means coöperating with the aforesaid elements for actuating the same.

In testimony whereof I affix my signature in presence of two witnesses.

WILMER THREADGILL.

Witnesses:
C. W. TATE,
J. PEREZ.